United States Patent [19]

Wood

[11] 3,949,542

[45] Apr. 13, 1976

[54] PROCESS FOR MAKING A LEAF RAKE AND THE LIKE

[76] Inventor: John B. Wood, 325 N. Carson Road (Pinson), Birmingham, Ala. 35126

[22] Filed: Jan. 2, 1975

[21] Appl. No.: 537,961

[52] U.S. Cl............................. 56/400.17; 76/111
[51] Int. Cl.²........................................ A01D 7/00
[58] Field of Search....... 56/400.17, 400.18, 400.01, 56/400.21, 400, 400.16; 76/111; 294/52, 55.5, 49

[56] References Cited
UNITED STATES PATENTS

| | | | |
|---|---|---|---|
| 1,983,596 | 12/1934 | Carlson | 56/400.17 |
| 2,794,312 | 6/1957 | Finkes | 56/400.21 |
| 2,836,032 | 5/1958 | Melvin | 56/400.17 |

Primary Examiner—Louis G. Mancene
Assistant Examiner—J. N. Eskovitz
Attorney, Agent, or Firm—Jennings, Carter & Thompson

[57] ABSTRACT

An improved process for securing the metal tines of leaf rakes in which the tines embody a row of notches in the ends thereof which are inserted in a holder. The holder is provided with relief cutouts in areas thereof at the ends of the row of notches. With the parts assembled a suitable tool is brought to bear on the outside surface of the holder, directly over the notches, in-forming an indentation which fits into the notches, thus to lock the tines in the holder. The openings in the holder provide relief for such indentation assuring that it extends completely across the holder and enters all the notches of the complete row of the same.

1 Claim, 5 Drawing Figures

PROCESS FOR MAKING A LEAF RAKE AND THE LIKE

My invention relates to an improved process for the securing to a holder metal tines commonly used in leaf rakes and the like.

In the art to which my invention relates it has long been common to provide a combined tine holder and handle holder for leaf rakes. This holder usually has been a sheet of metal which has been stamped out and formed by dies to provide at one end a tapering holder for a handle and at the other end an elongated open section to receive the ends of the tines. In the case of tines which are made of flat stock it has been customary to provide a row of notches across the portions thereof which lie inside the metal holder. A tool has been used in a press to force the metal inwardly, the idea being to in-form or indent the metal so that it engages in the row of notches, thus to lock the tines in place. However, difficulty has been experienced with such prior construction and assembly method due to the fact that the metal of the holder is hard to indent into the notches, requires a great deal of force and also oftentimes fails to catch the last of the tines at the ends of the row of tines. These tines become loose, and when this happens the remaining tines shift laterally and eventually also become loose and come out of the holder.

In view of the foregoing an object of my invention is to provide a process for assemblying in a holder tines of the character indicated in which there is improved means to permit the in-forming of the indentation into the notches in the tines in such fashion as to assure that the indentation extends completely across the entire row of notches, thereby assuring that all of the tines are accurately and adequately locked into the holder.

A further object of my invention is to provide a process for assemblying tines in a holder of the character designated in which less force is required to form the indentation mentioned while at the same time affording the advantages heretofore mentioned.

A tine holder made according to the process of my invention is shown in the accompanying drawings forming a part of this application, in which.

Figure 1:
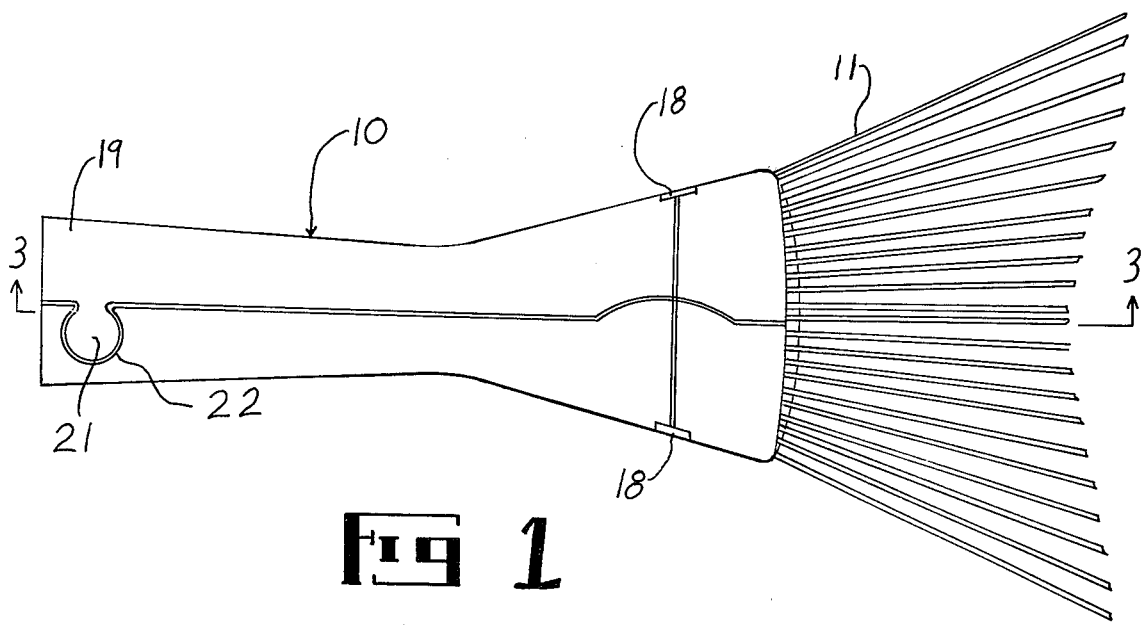
FIG. 1 is a plan view showing the combined tine holder and handle holder, the tines being broken away at their outer ends.
Figure 2:
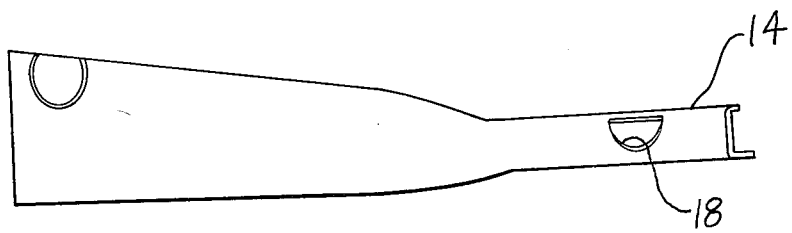
FIG. 2 is a side elevational view of the holder with the tines removed.
Figure 5:
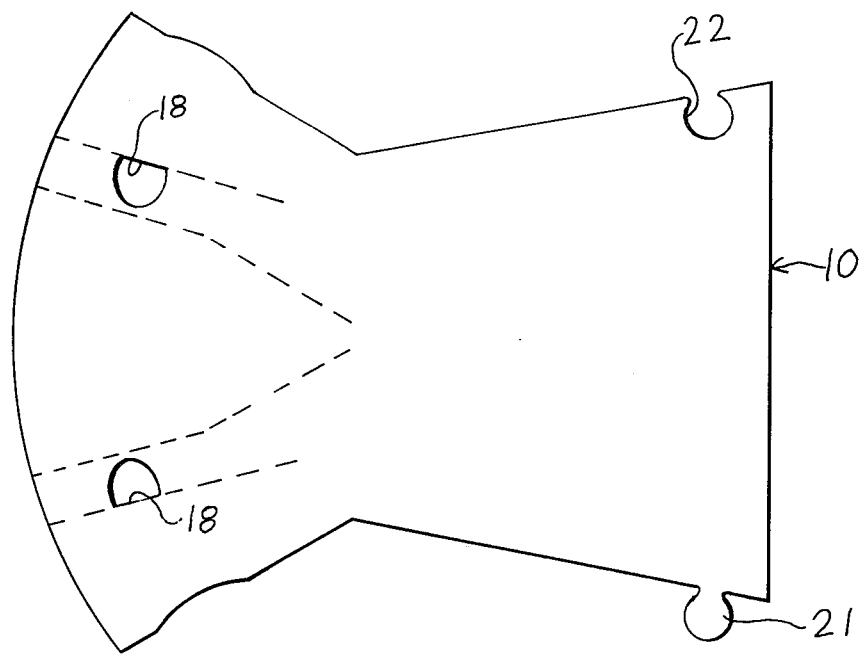
FIG. 5 is a developed view of the metal holder prior to bending the same to the shape shown in the remaining figures of the drawings.

Referring now to the drawings for a better understanding of my invention, I illustrate in FIG. 1 a combined tine holder and handle holder for a leaf rake indicated generally by the numeral 10. In the manner understood in the art, a plurality of flat spring steel tines 11 have their inner ends 12 twisted at 90° to the outer ends (the outer ends not being shown). These ends 12 are then inserted into the generally rectangular opening 13 formed in the tine end 14 of the holder 10. As is understood in the art, the holder is made from a sheet of metal and in developed condition it may appear as in FIG. 5, insofar as its general overall configuration is concerened.

Figure 3:
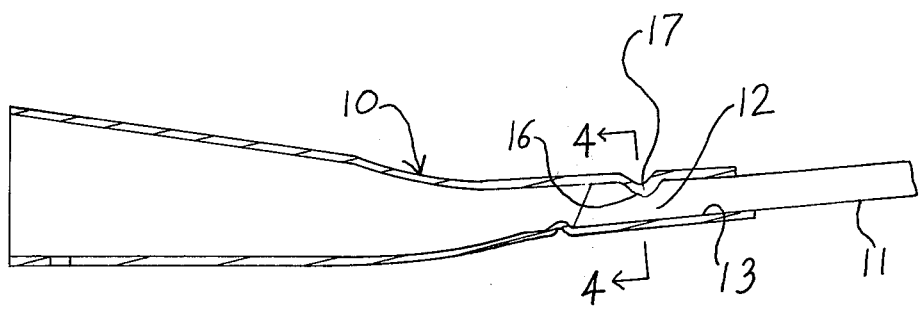
FIG. 3 is a detail sectional view taken generally along line 3—3 of FIG. 1.
Figure 4:
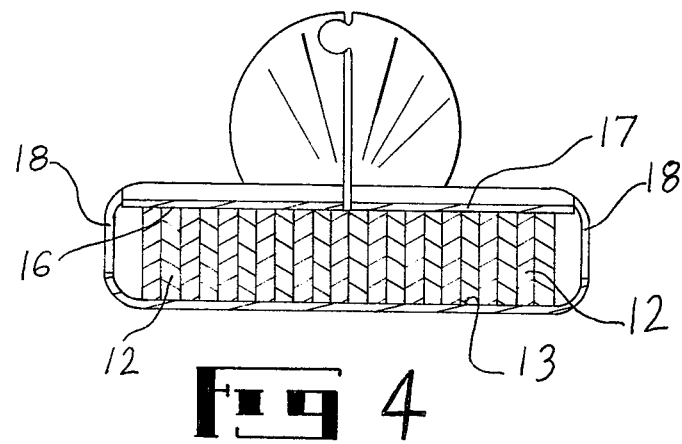
FIG. 4 is an enlarged detail fragmental sectional view taken along line 4—4 of FIG. 3.

Also as is understood in the art it is customary to provide the tines 11, on the edges thereof which are inserted into the holder, with a notch indicated in FIG. 3 by the numeral 16. Also as is customary, when the tines are assembled in the holder a suitable tool is used to in-form the metal of the portion 14 to provide an indentation 17 which engages in the row of notches, the purpose being to hold the tines against displacement.

My invention comprises providing in the metal housing openings 18 which are located at the ends of the indentation 17. As shown in the several figures these cutouts 18 provide clearance all the way across the body of the housing where the indentation 17 is to be formed so that when the tool used to form the indentation moves downwardly it encounters less resistance. This causes the indentation 17 to extend completely across the housing, assuring that it enters not only the intermediate notches but also the notches on the outermost ones of the row of tines. The tines thus are effectively locked in place, completely across the row of the same and it is impossible for the endmost ones to become disengaged by moving away from the adjacent tine thus to escape the indentation. Furthermore, I have found that by providing the relief openings 18 I am enabled to form the indentation 17 with much less pressure than heretofore has been the case, thus increasing the life of the tools, permitting the use of a smaller press, etc.

It will be noted also that in the drawings I have shown the usual handle section 19 for the holder and the usual locking tab 21 fitting in the usual cutout 22 therefor.

In view of the foregoing it will be seen that I have devised an improved and simple process for assemblying the tines of leaf rakes and the like. As stated, the use of the relief openings permits the use of a die or former which may extend completely across the width of the holder at the point where the indentation 17 is to be formed. Since the side wall metal is removed in the places indicated at 18, the indentation is readily forced into the row of notches, thus locking all the tines in place. Since the indentation 17 extends completely across the row of notches the endmost ones of the tines cannot slip past that indentation as has heretofore been the case.

While I have shown my invention in but one form, it will be obvious to those skilled in the art that it is not so limited, but is susceptible of various other modifications without departing from the spirit thereof.

What I claim is:

1. In a leaf rake or the like of the kind having a plurality of tines and a hollow sheet metal holder for the inner side-by-side ends of the tines, said tines having notches in the sides thereof which are transversely aligned in a row within the holder, said hollow holder being defined by parallel walls lying adjacent the sides of the inner ends of the side-by-side tines and side walls joining said parallel walls, the improvement comprising:

a. a transversely extending in-formed indentation in the parallel wall lying adjacent said notches extending transversely across the entire row of said notches, said indentation lying inwardly of the tops of the side walls which join the parallel wall containing said indentation, and b. there being cut-outs in the said side walls of the holder located at each end of said indentation so that the indentation stops short of the side walls but interfits the entire row of notches thereby positively securing all of the tines in the holder.

* * * * *